United States Patent
Fisher et al.

(10) Patent No.: US 7,684,622 B2
(45) Date of Patent: *Mar. 23, 2010

(54) METHOD, SYSTEM AND PROGRAM PRODUCT FOR REPRESENTING A PERCEPTUAL ORGANIZATION OF AN IMAGE

(75) Inventors: Danyel A. Fisher, Irvine, CA (US); Martin M. Wattenberg, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/252,086

(22) Filed: Oct. 15, 2008

(65) Prior Publication Data
US 2009/0052781 A1 Feb. 26, 2009

(51) Int. Cl.
*G06K 9/48* (2006.01)
*G06K 9/54* (2006.01)

(52) U.S. Cl. .................. 382/199; 382/302; 382/305

(58) Field of Classification Search .......... 380/151, 380/154, 173, 199, 254, 302, 305; 345/420, 345/441, 467, 468; 382/260, 266, 276; 707/3
See application file for complete search history.

(56) References Cited

U.S. PATENT DOCUMENTS

| 5,666,441 A | * | 9/1997 | Rao et al. | ................. 382/203 |
| 6,157,733 A | | 12/2000 | Swain | |
| 2003/0156762 A1 | * | 8/2003 | August | ................. 382/260 |
| 2005/0232511 A1 | * | 10/2005 | Ziou et al. | ................. 382/276 |

OTHER PUBLICATIONS

Ruzon et al., "Edge, Junction, And Corner Detection Using Color Distribution". IEEE Transaction on Pattern Analysis and Machine Intelligence, vol. 23, No. 11, 2001, pp. 1281-1295.

* cited by examiner

*Primary Examiner*—Samir A. Ahmed
*Assistant Examiner*—Mehdi Rashidian
(74) *Attorney, Agent, or Firm*—Daniel McLoughlin; Hoffman Warnick LLC

(57) ABSTRACT

Under the present invention, an image is progressively blurred to yield a set of (progressive) scaling levels. Once blurred, the edges of the image are detected so that each image segment can be identified on each scaling level. Once the segments are identified, like segments (i.e., segments having a like edge/Gaussian operator) on successive scaling levels are linked to yield a lattice structure that represents the perceptual organization of the image.

16 Claims, 14 Drawing Sheets

40 — From there to here
From here to there  ←——— 24
Funny things are
Everywhere

42 ——— Dr. Seuss

↓ 42 s=1    s=4 s=7    s=11

METHOD, SYSTEM AND PROGRAM PRODUCT FOR REPRESENTING A PERCEPTUAL ORGANIZATION OF AN IMAGE

CROSS-REFERENCE TO RELATED APPLICATION

This application claims priority of utility patent application Ser. No. 10/819,588, filed on Apr. 7, 2004, which claims the benefit of provisional application Ser. No. 60/461,082, filed Apr. 8, 2003, entitled "Method, System and Program Product for Representing Perceptual Organization of an Image," herein incorporated by reference.

BACKGROUND OF THE INVENTION

1. Field of the Invention

In general, the present invention relates to a method, system and program product for representing a perceptual organization of an image. Specifically, the present invention represents a perceptual organization of an image in information graphics using multiple resolutions/scaling levels.

2. Related Art

The design of information visualization software remains a poorly understood, hit-or-miss process. Part of the difficulty is that models for how humans extract information from visual displays remain incomplete. Indeed, seemingly minor design variations can have dramatic effects on comprehensibility. As a result, creating effective displays often requires expensive user tests, time-consuming redesigns, and even a certain amount of guesswork.

Many researchers have recognized these problems and have investigated guidelines and models for the perception of information graphics. Specifically, much work has been done on the efficacy of different visual encodings, resulting in useful rules about the use of color, position, area, etc. to represent different types of variables. Others, for example, have investigated how models of pre-attentive processing can be used in designing visualizations.

Unfortunately, these lines of research do not address a key element in the efficacy of an information graphic. That is, the degree to which its perceptual organization reflects the organization of the underlying data. Many authors have stressed that to design successful information graphics one must take into account the effects of perceptual grouping. For instance, Kosslyn (1998) contains many examples in which unintentional grouping effects lead to confusing displays. It would therefore be useful to have a tool that helped designers assess the perceptual organization of their designs Still yet, some attempts have been made to model perceptual organization in information graphics. To this extent, general guidelines, such as the "Macro/Micro" principle have been provided. However, quantitative models suitable for software implementation are rare. Several authors have analyzed special classes of displays: For example, Tullis (1984) analyzes alphanumeric screens; Shneiderman et al. (1995) investigate standard Visual Basic dialog boxes. The work of Saund (1990) on deriving perceptual structure in the context of sketch editing is more ambitious, but still requires a vectorized version of a graphic as input. Because it is not amenable to the analysis of non-vector-based visualizations, it is problematic to apply his method to the output of existing programs.

In view of the foregoing, there exists a need for a method, system and program product for representing a perceptual organization of an image through information graphics. Specifically, a need exists whereby an image can be progressively blurred to form a set of scaling levels. A further need exists for edges of the image on each scaling level to be detected so that segments of the image can be identified. Another need exists for like segments on successive scaling levels to be linked to form the perceptual organization of the image.

SUMMARY OF THE INVENTION

In general, the present invention provides a method, system and program product for representing a perceptual organization of an image through information graphics such as in the form of a lattice structure. Specifically, under the present invention, an image is progressively blurred to yield a set of (progressive) scaling levels. Once blurred, the edges of the image are detected so that each image segment can be identified on each scaling level. Once the segments are identified, like segments (i.e., segments having a like edge/Gaussian operator) on successive scaling levels are linked to yield a lattice structure that represents the perceptual organization of the image.

A first aspect of the present invention provides a computer-implemented method for representing a perceptual organization of an image, comprising: progressively blurring the image to yield a set of scaling levels, and allocating a spatial index that comprises a rectangular array of integers for each of the set of scaling levels; detecting edges of the image on each of the set of scaling levels; identifying individual segments of the image on each of the set of scaling levels based on the detected edges, and assigning each of the individual segments a non-zero integer an identifier, wherein corresponding elements of the associated spatial index are set to the identifier; and linking like individual segments on successive scaling levels based on a comparison of corresponding identifiers of the individual segments to yield a lattice structure, wherein the lattice structure represents the perceptual organization of the image.

A second aspect of the present invention provides a computer-implemented method for representing a perceptual organization of an image, comprising: progressively blurring the image to yield a set of scaling levels, and allocating a spatial index that comprises a rectangular array of integers for each of the set of scaling levels; applying an edge filter to the image on each of the set of scaling levels to determine edge operators; detecting edges of the image on each of the set of scaling levels based on the edge operators; identifying individual segments of the image on each of the set of scaling levels corresponding to the detected edges, and assigning each of the individual segments a non-zero integer as an identifier, wherein corresponding elements of the associated spatial index are set to the identifier; and linking the individual segments on successive scaling levels that have like edge operators based on a comparison of corresponding identifiers of the individual segments to yield a lattice structure, wherein the lattice structure represents the perceptual organization of the image.

A third aspect of the present invention provides a computerized system for representing a perceptual organization of an image, comprising: a scaling system for progressively blurring the image to yield a set of scaling levels, and allocating a spatial index that comprises a rectangular array of integers for each of the set of scaling levels; an edge detection system for detecting edges of the image on each of the set of scaling levels; a segment identification system for identifying individual segments of the image on each of the set of scaling levels based on the detected edges, and assigning each of the individual segments a non-zero integer as an identifier, wherein corresponding elements of the associated spatial index are set to the identifier; and a linking system for linking like individual segments on successive scaling levels based on a comparison of corresponding identifiers of the individual segments to yield a lattice structure, wherein the lattice structure represents the perceptual organization of the image.

A fourth aspect of the present invention provides a program product stored on a recordable medium for representing a perceptual organization of an image, which when executed, comprises: program code for progressively blurring the image to yield a set of scaling levels, and allocating a spatial index that comprises a rectangular array of integers for each of the set of scaling levels; program code for detecting edges of the image on each of the set of scaling levels; program code for identifying individual segments of the image on each of the set of scaling levels based on the detected edges, and assigning each of the individual segments a non-zero integer as an identifier, wherein corresponding elements of the associated spatial index are set to the identifier; and program code for linking like individual segments on successive scaling levels based on a comparison of corresponding identifiers of the individual segments to yield a lattice structure, wherein the lattice structure represents the perceptual organization of the image.

Therefore, the present invention provides a method, system and program product for representing a perceptual organization of an image through information graphics such as in the form of a lattice structure.

BRIEF DESCRIPTION OF THE DRAWINGS

These and other features of this invention will be more readily understood from the following detailed description of the various aspects of the invention taken in conjunction with the accompanying drawings in which.

Figure 1:
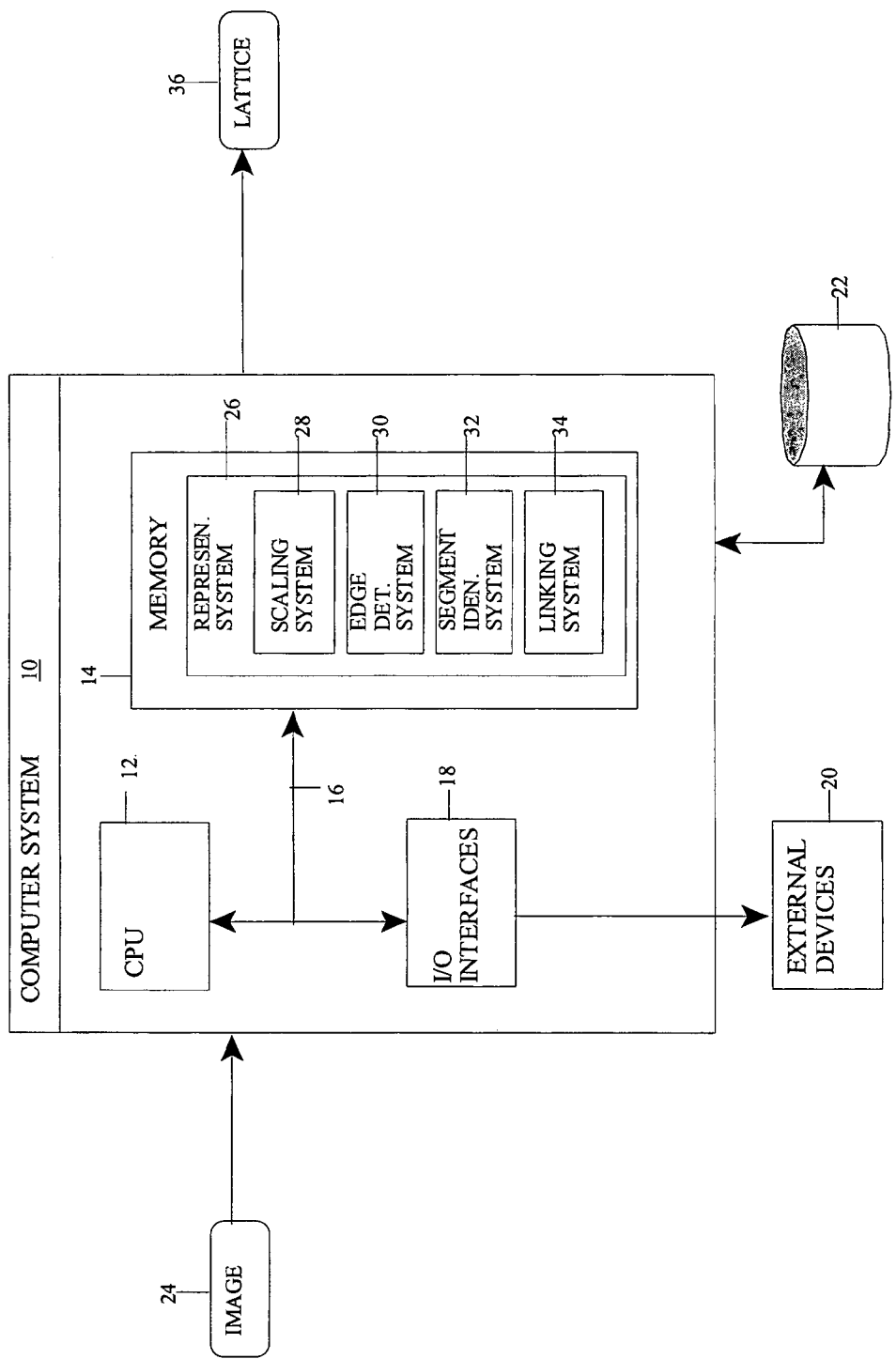
FIG. 1 depicts an illustrative system representing a perceptual organization of an image according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for representing a perceptual organization of an image through information graphics such as in the form of a lattice structure. Specifically, under the present invention, an image is progressively blurred to yield a set of (progressive) scaling levels. Once blurred, the edges of the image are detected so that each image segment can be identified on each scaling level. Once the segments are identified, like segments (i.e., segments having a like edge/Gaussian operator) on successive scaling levels are linked to yield a lattice structure that represents the perceptual organization of the image.

Referring now to FIG. 1, the teachings of the present invention will be described in greater detail. In general, a computer system 10 will process an image 24 and output a lattice structure 36 (e.g., a tree) that is representative of the perceptual organization of image 24. To this extent, computer system 10 can be any type of system that is capable carrying out the teachings of the present invention. For example, computer system 10 could be a workstation, a personal computer, a laptop, a hand-held device, etc. As depicted, computer system 10 generally comprises central processing unit (CPU) 12, memory 14, bus 16, input/output (I/O) interfaces 18, external devices/resources 20 and storage unit 22. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, etc. Moreover, similar to CPU 12, memory 14 may reside at a single physical location, comprising one or more types of data storage, or be distributed across a plurality of physical systems in various forms.

I/O interfaces 16 may comprise any system for exchanging information to/from an external source. External devices/resources 20 may comprise any known type of external device, including speakers, a CRT, LCD screen, handheld device, keyboard, mouse, voice recognition system, speech output system, printer, monitor/display, facsimile, pager, etc. Bus 16 provides a communication link between each of the components in computer system 10 and likewise may comprise any known type of transmission link, including electrical, optical, wireless, etc.

Storage unit 22 can be any system (e.g., database) capable of providing storage for information under the present invention. Such information could include, for example, images, scaling factors, lattice structures, etc. As such, storage unit 22 could include one or more storage devices, such as a magnetic disk drive or an optical disk drive. In another embodiment, storage unit 22 includes data distributed across, for example, a local area network (LAN), wide area network (WAN) or a storage area network (SAN) (not shown). Although not shown, additional components, such as cache memory, communication systems, system software, etc., may be incorporated into computer system 10.

Figures 2A, 2B:
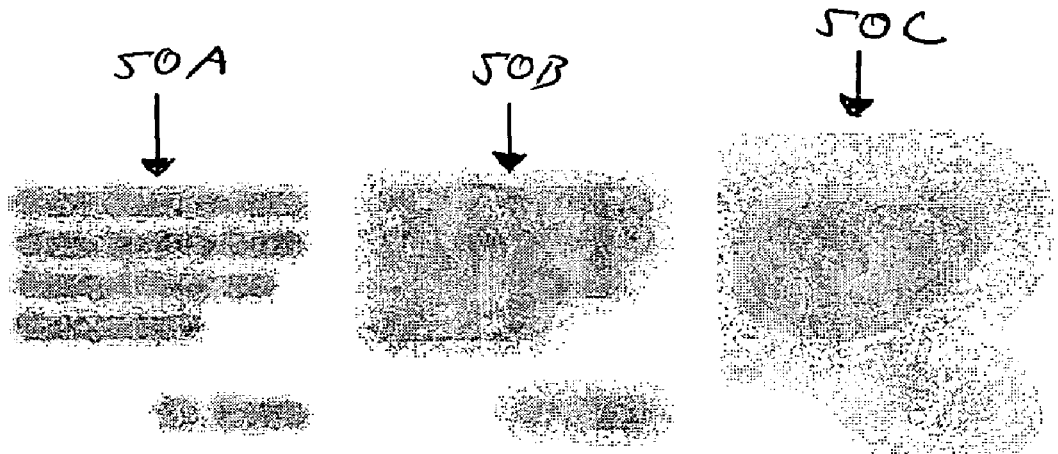
FIG. 2A depicts an illustrative image according to the present invention.
FIG. 2B depicts the image of FIG. 2A progressively blurred to provide multiple scaling levels according to the present invention.

Stored within memory of computer system 10 is representation system 26, which includes scaling system 28, edge detection system 30, segment identification system 32 and linking system 34. Under the present invention, image 24 is provided to computer system 10. Referring to FIG. 2A, image 24 is shown in greater detail. As depicted, image 24 comprises a first portion of text 40 and a second portion of text 42. It should be understood, however, that text is only illustrative of one type of image that can be processed under the present invention. For example, the teachings described herein could be used to process graphics or other material. Regardless, scaling system 28 will progressively scale image 24. In a typical embodiment, scaling occurs by progressively blurring (i.e., convolving) image 24 with a Gaussian kernel to yield a set of (progressive) scaling levels. For example, image 24 could be blurred with four distinct "blurring" factors to yield four distinct scaling levels.

To define scale space precisely, some notation is need. First, the input image 24 is represented as a function:

$$f:[0,L] \times [0,L] \rightarrow [0,1].$$

That is, $f$ is taken to be a function on a square of side L, where a value of 0 corresponds to black, 1 to white, and values in between correspond to shades of gray. Given the function $f$, its domain is extended to a 3-dimensional "scale space" by a special family of functions $f_s$ where $s \geq 0$. To this extent, $G_s$ is a Gaussian kernel with "width" s. Specifically, the following formula applies $$G_s(x, y) = \frac{1}{2\pi s^2} e^{-(x^2+y^2)/2s^2}$$

We define then $f_s$ by $$f_s = f * G_s$$

where * represents convolution/blurring and the function $f_s$ represents the original image 24 having been blurred by a scaling factor of s. Referring to FIG. 2B, $f_s$ for three different values of s is shown. Specifically, FIG. 2B shows image 24 on three different scaling levels 50A-C after having been progressively scaled/blurred according to the above formulae by scaling system 28. For example, FIG. 2B shows image 24 after having been progressively scaled/blurred by scaling factors of 4, 7 and 11, respectively. The 3-dimensional space formed by the spatial dimensions x,y and the new scale dimension s is known as scale space. By analyzing the functions $f_s$ on this 3-dimensional scale space we can get at important structures in the original 2-dimensional image 24. For each scale level 50A-C, a new rectangular array of integers is allocated the same dimensions as the original pixel buffer, which is termed the "spatial index" for that scale level.

After scaling, edge detection system 30 (FIG. 1) will then detect the edges of image 24 on each scaling level 50A-C. In general, edge detection occurs by applying a Gaussian edge detection filter (e.g., within edge detection system 30) to image 24 on each scaling level 50A-C to determine edge operators for image on each scaling level 50A-C. Edge operators denoting actual content of image 24 (such as an edge of letters) will typically be non-zero values such as −1 or +1. To accomplish edge detection, however, a notion of structure or organization at a given scale is provided under the present invention. As known, there are many possible ways to define a structure. The present invention defines structure by creating a segmentation of image 24 at each scale 50A-C. For a given scale s, the following difference-of-gaussians edge detection function is considered:

$$g_s = f_s - f_{3s/2}.$$

Figure 3:
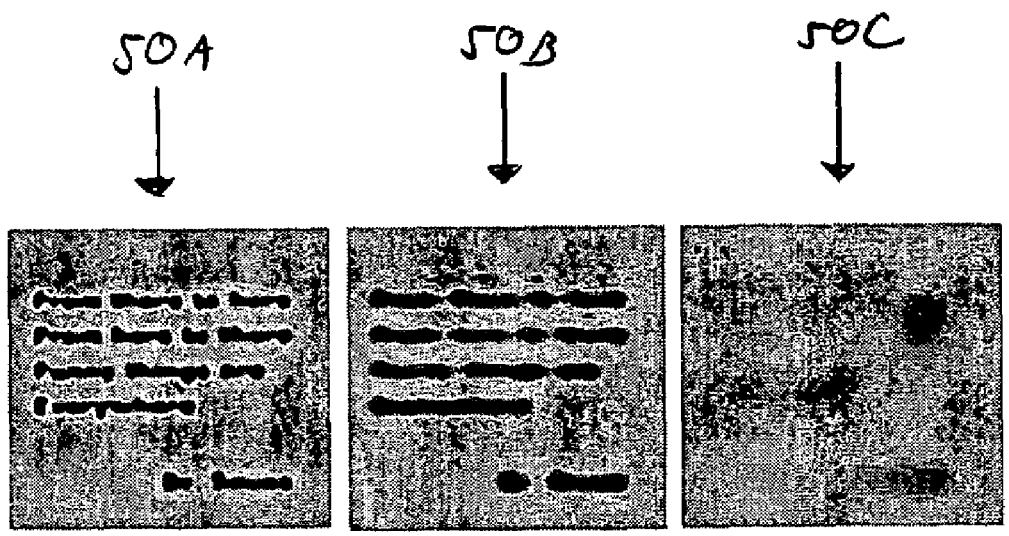
FIG. 3 depicts edge detection for the scaling levels of FIG. 2 according to the present invention.

This function has some correspondence to the responses of retinal neurons. It is a close approximation of another classical edge detector, the Laplacian operator, but numerically more stable. FIG. 3 shows the function $g_s$ for the Dr. Seuss image at scaling levels 50A-C. In FIG. 3, 50% or medium gray coloring/shading represents an edge operator of 0, dark gray represent an edge operator of −1, while light gray represents an edge operator of +1. Thus, edges are detected wherever medium gray is not present.

Once edges have been detected, segment identification system 32 (FIG. 1) will utilize the detected edges to identify the various image segments (on each of the scaling levels 50A-C). In general, segments are defined where the edge (e.g., Gaussian) operators are not equal to zero. Specifically, as indicated above, application of the edge detection filter typically yields a non-zero value (i.e., −1 or +1) wherever an image segment exists. By identifying these non-zero values on each scaling level 50A-C, the segments are identified. The sign of $g_s$ also has significance, namely, it roughly corresponds to whether the segment is brighter or darker than its neighbors.

The use of the difference-of-gaussians edge detector under the present invention has several advantages. First, simplicity: it is well-understood and efficient to calculate. Second, unlike several other popular edge detectors (e.g., Canny, 1986 or Shen and Castan, 1992), the difference-of-gaussians method has the benefit of immediately producing closed contours, thus creating a segmentation without additional steps. Third, the sign of the function $g_s$ is useful in creating an algorithmic version of the linking step below.

Figure 4:
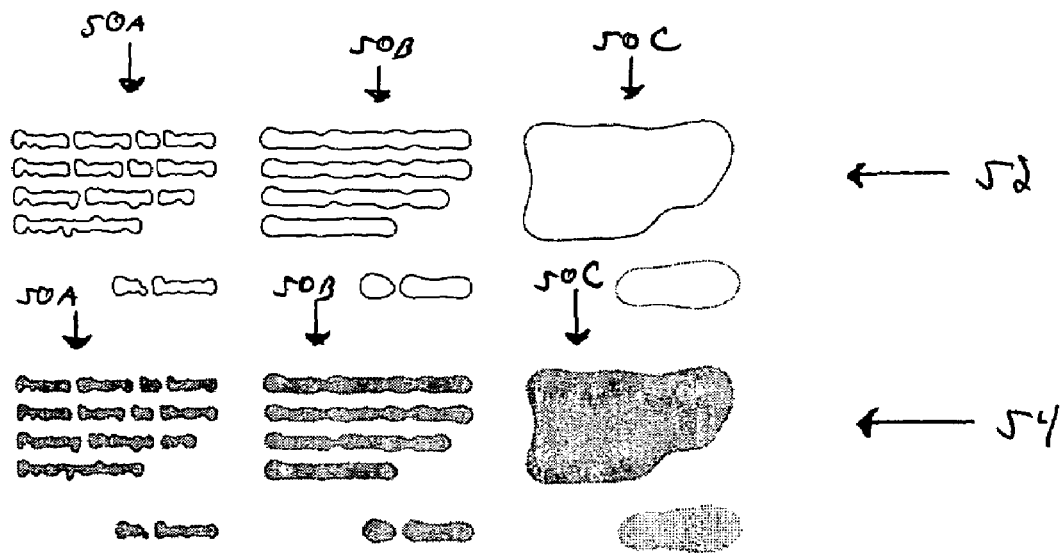
FIG. 4 depicts segment identification for the scaling levels based on the edges detected in FIG. 3 according to the present invention.

FIG. 4 shows the resulting segmentation for scaling levels 50A-C (e.g., at scales of 8, 16, and 44). In the top row 52, the edges of segments are shown. In the bottom row 54, each segment has been filled with a single gray tone representing the average grayscale value of the pixels in the segment, a technique we call a Gestalt cartoon. (This in itself is a small but interesting visualization issue: informal tests showed that for complex segmentations, users found these Gestalt cartoons easier to interpret than an outline view.) In either row 52 or 54, clear segments can be seen. For example, at scaling level 52A, the segments comprise individual words within image 24 (FIG. 1). At scaling level 52B, each segment comprises a line of text within image 24. At scaling level 50C, each segment represents an individual block or paragraph of text within image 24.

Regardless, each segment is then assigned a unique non-zero integer as an identifier, and is represented by a set of coordinates corresponding to the collection of pixels in that segment, as well as the sign of the edge filter. Then, to each array element at location (x,y) of the spatial index, we assign the value of the unique identifier of the segment containing it. If the pixel at (x,y) is not contained in a segment (as can happen if it lies directly on an edge) then it is assigned the value zero. Note that this step may be efficiently performed in parallel with the previous step.

Although edge detection is not the only way to locate structure at a given scale, it has shown to be the most optimal. Probably the most common method currently used is to analyze local maxima and minima of the function $f_s$ (Witken, 1983; and Koenderink, 1984). Often this analysis is accompanied by some sort of watershed segmentation (Lindeberg, 1994; and Leung, et al., 2000). However, several variants of this technique produced poor results, possibly due to the non-generic nature of typical information graphics. Compared to images of natural scenes, diagrams and visualizations have an unusual number of areas of uniform brightness. In many cases it was found that the graph of $f_s$ contained ridges, valleys, and plateaus that were not level, leading to a proliferation of local extrema that did not correspond to useful features in the image. Since such artifacts were not present with the edge detection scheme described above, it was employed under the present invention.

After the image segments have been detected on each scaling level, linking system 34 (FIG. 1) will link like segments on successive levels to form lattice structure 36 (e.g., a tree). Specifically, linking system 34 will link image segments having like edge operators on successive scaling levels. That is, image segments on successive scaling levels having edge operators of +1 will be linked together, while image segments on successive scaling levels having edge operators of –1 will be linked together. For example, assume that the progressive blurring operation yielded the scaling levels of 50A-C (with scaling level 50C being the most blurred). In this case, an image segment having an edge operator of –1 on scaling level 50A would be linked with an image segment having an edge operator of –1 on scaling level 50B, and so on and so forth. To link segmentations at successive scaling levels, one of the spatial indices is scanned. For each nonzero element of the array—corresponding to a segment S—we look at the identifier in the corresponding pixel position in the other spatial index. If that identifier is nonzero, corresponding to a segment T, we then link S and T if both have the same sign under the edge filter.

This process will be further described in conjunction with FIGS. 5-8. As described above, the model finds structure at a single scale. However, the perceptual structure of image 24 includes not just the structure at one scale, but the relationships between features at different scales. In the scale space literature, linking features between scales is often referred to as finding the deep structure of an image (Koenderink, 1984). In this section we describe a novel method of finding this deep structure that is particularly useful for information graphics.

Figure 5:
FIG. 5 depicts a series of Gestalt cartoons progressively blurred according to the present invention.
Figure 5:

Consider the segmentations of portion 42 of image 24 in FIG. 5, shown as a series of Gestalt cartoons. It is visually clear that the two blobs in the s=11 view correspond to the individual letters of the words "Dr." and "Seuss" respectively. The final part of our model is a method of making this intuition precise. For example, let $S_1$ and $S_2$ be two image segments found at scales $s_1 \leq s_2$ respectively. $S_1$ and $S_2$ can be viewed as embedded within the 3D scale space, i.e. as the sets $\{s_1\} \times S_1$ and $\{s_2\} \times S_2$. Thus, $S_1$ is linked to $S_2$, denoted by $S_1 \leq S_2$, if either $S_1 = S_2$ or there is a path through scale space from a point on $S_1$ to a point on $S_2$, such that $g_s$ maintains the same sign and s is monotonically increasing. It can is then be verified that the relation "$\leq$" defines a partial order on the set of segments. It is also noted from the definition that this partially ordered set breaks into two disconnected components, one that corresponds to the subset of segments where $g_s < 0$, which is denoted as $L^-$ and one we call $L^+$ where $g_s > 0$. (It is possible for each of these two sets to have many maximal elements.) In some cases, $L^-$ and $L^+$ turn out to correspond to foreground and background elements. For example, in the Dr. Seuss image, the segments corresponding to the text are represented in $L^-$ while the whitespace is represented in $L^+$.

Figure 6:
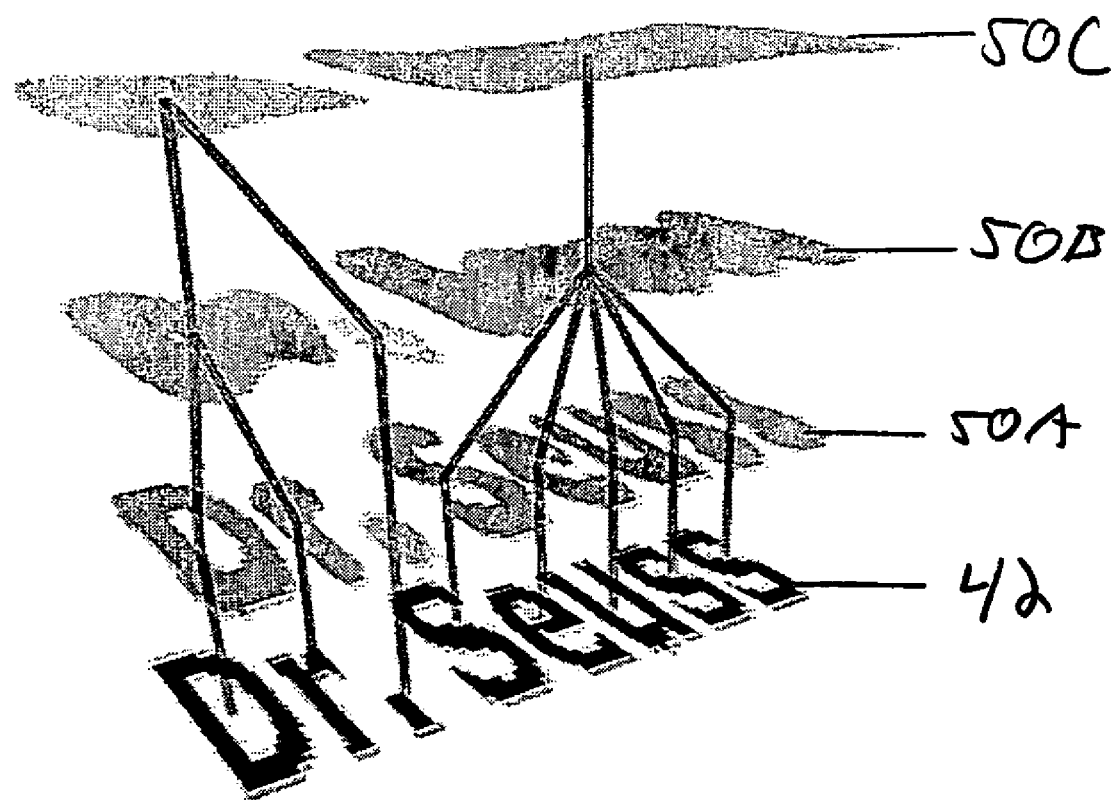
FIG. 6 depicts the linking of like segments of the image of FIG. 5 on successive scaling levels according to the present invention.

FIG. 6 depicts is a visualization of the results of connecting linked segments in $L^-$ for the Dr. Seuss portion 42 of the image on scaling levels 50A-C. In particular, FIG. 6 shows a 3D view of scale space, with four separate planes highlighted (corresponding to s=1, 4, 7, 11). For each plane, the segmentation for the corresponding s value is shown, and for each pair of linked segments in adjacent planes a line has been drawn between the segments' centroids. For simplicity, in this diagram only the $L^-$ segments have been shown (i.e., the segments with negative $g_s$) since they account for the main visual structure. The result is a tree structure on the words that corresponds to the intuitive hierarchical division of a phrase into words and words into letters.

Figure 7:
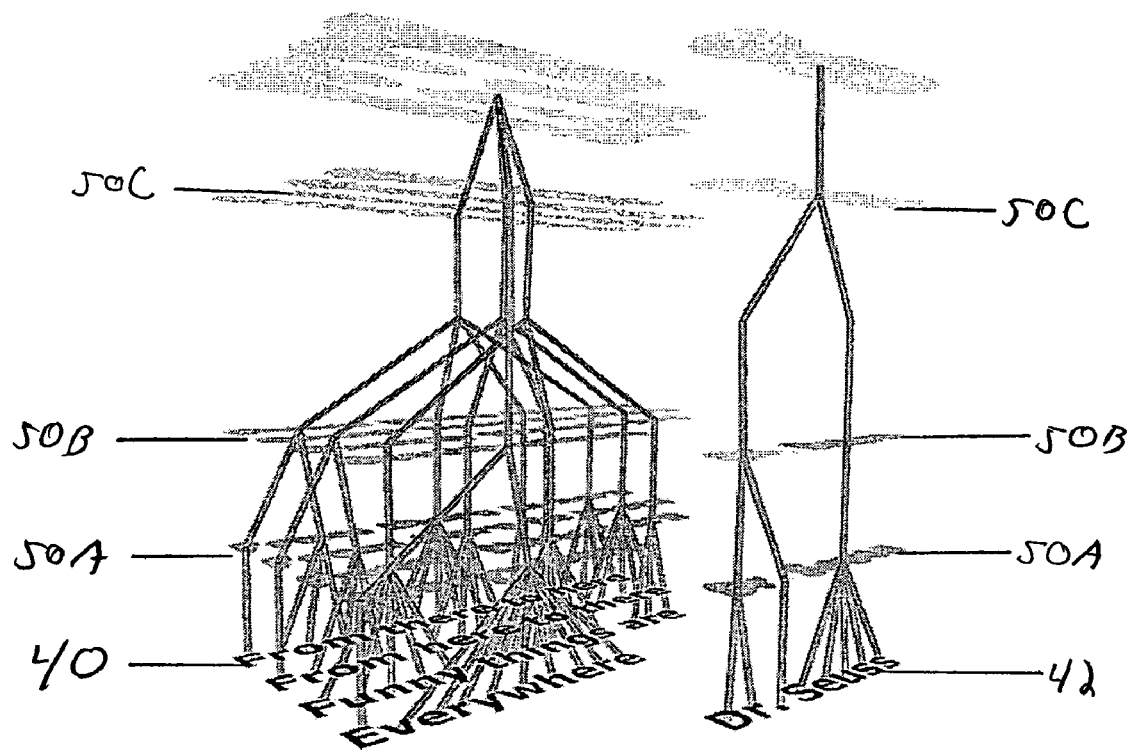
FIG. 7 depicts the linking of like segments of the image of FIG. 2B on successive scaling levels according to the present invention

It should be noted that the choice of a 3D display is a visualization exercise in its own right. Various alternatives, such as abstract graph-theoretic views of the lattice and a layout of 2D thumbnails with connections drawn between segments were attempted. In these cases, however, users were uniformly confused about the connection between the lattice structure and the image. For completeness the $L^-$ lattice for the entire image 24 (FIG. 1) is shown in FIG. 7 for scaling levels 50A-C. Again, the structure nicely corresponds to the intuitive hierarchy of paragraphs, lines, words, and letters.

Figure 8:
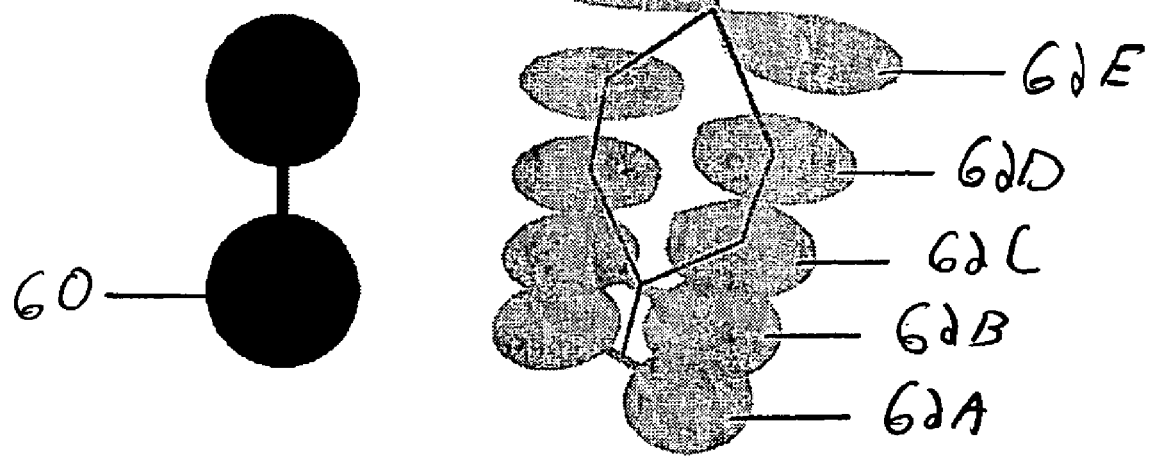
FIG. 8 depicts a non-tree like image created by linking like segments of successive scaling levels according to the present invention.

It should be understood that the segmentation described above can also produce non-nested segments with non-tree lattices. A non-tree lattice is desirable for modeling the visual experience of certain images. FIG. 8 gives an example of an image whose visual structure is not tree-like. The barbell image 60, at a small scale, is one continuous object, at a slightly larger scale 62D breaks into two main parts, and at a large scale merges 62E into one object again.

It should be understood that the teachings described herein could be implemented on a stand-alone computer system 12 as shown in FIG. 1, or over a network in a client-server environment. In the case of the latter, the client and server could communicate over any type of network such as the Internet, a local area network (LAN), a wide area network (WAN), a virtual private network (VPN), etc. As such, communication between the client and server could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the client could utilize an Internet service provider to establish connectivity to the server. These concepts also apply to communication between data modeler 14, IT personnel 16 and data warehouse 18.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

ILLUSTRATIVE EXAMPLES

In general, representation system 26 contained the following numerical approximation of the model: The image functions $f_s$ were represented as 2-dimensional arrays of floating-point values (one per pixel in the original image), and computed $f_s$ for only a few discrete values of s. To perform linking, each pair of successive approximations to $f_s$ was analyzed. Any two segments that shared a sign and which overlapped were connected. One implementation was written in Java, and on a 700 MHz Pentium 3 PC that required up to a minute to perform a full structural analysis on a 800×600 pixel image at 15 scales. Once the analysis was performed, it was saved for viewing as both a series of grayscale images and as a 3D VRML file. This architecture lent itself naturally to a web-based tool.

Figure 9:
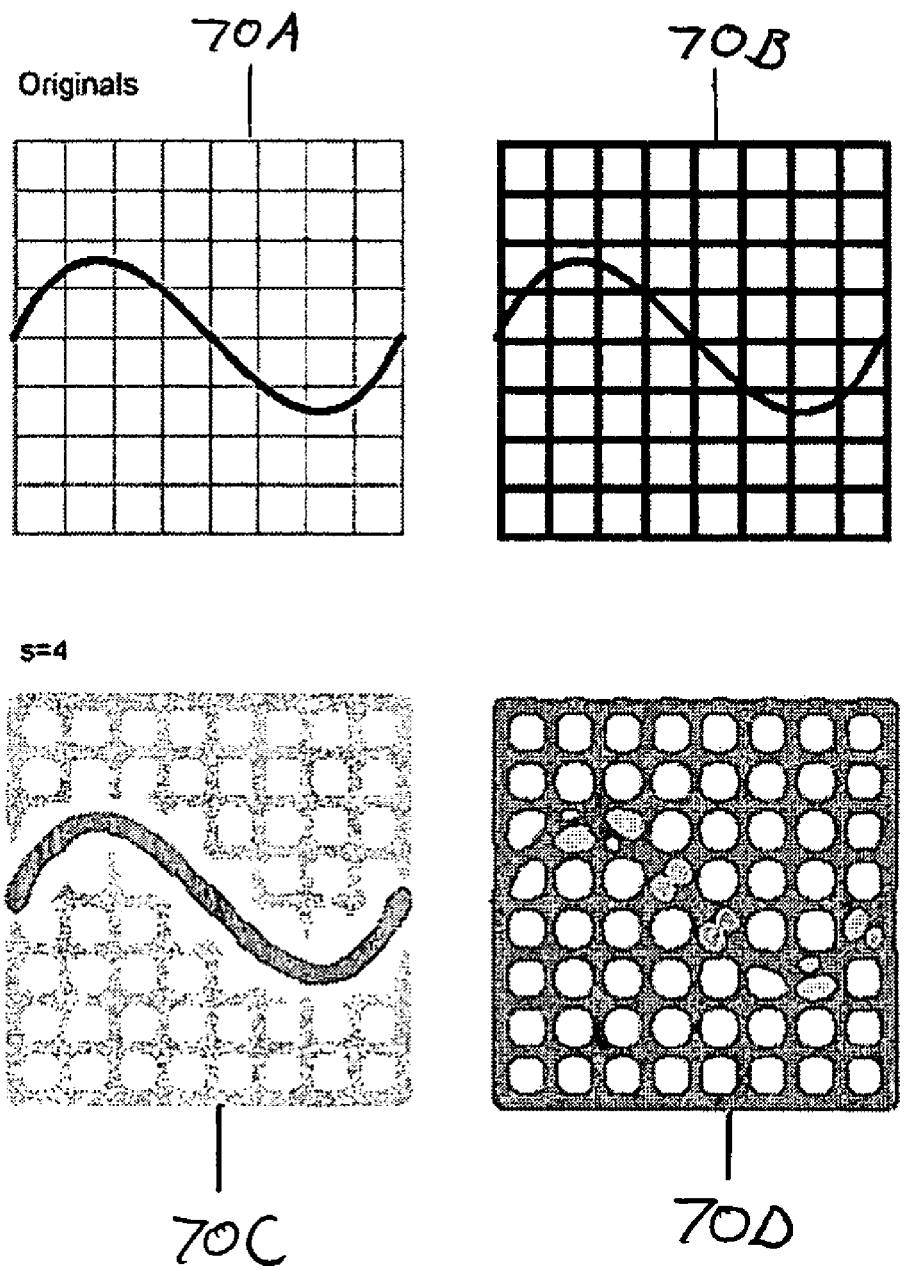
FIG. 9 depicts Gestalt cartoons of two versions of a simple graph according to the present invention.

A first example shows Gestalt cartoons of two versions of a simple graph in FIG. 9. At the top left is a graph 70A with thin gridlines, at top right is a graph 70B with overpoweringly thick ones. The segmented versions at scale s=4 are shown below at graphs 70C-D, respectively. In the graph 70B, the graph itself is not segmented from the background. This is an indication of both the strength of the model of the present invention. A human can segment the graph in the second diagram by using orientation information, which our model ignores. Nonetheless, doing so places an additional cognitive burden on the viewer, and in fact it is a standard principle of information design that grid lines should be significantly lighter than lines representing "foreground" data. Thus the model indicates, correctly, that there is a problem with the graph. This situation—where a minor visual change has a large effect on comprehensibility—is exactly where it is useful to have a model.

Figure 10:
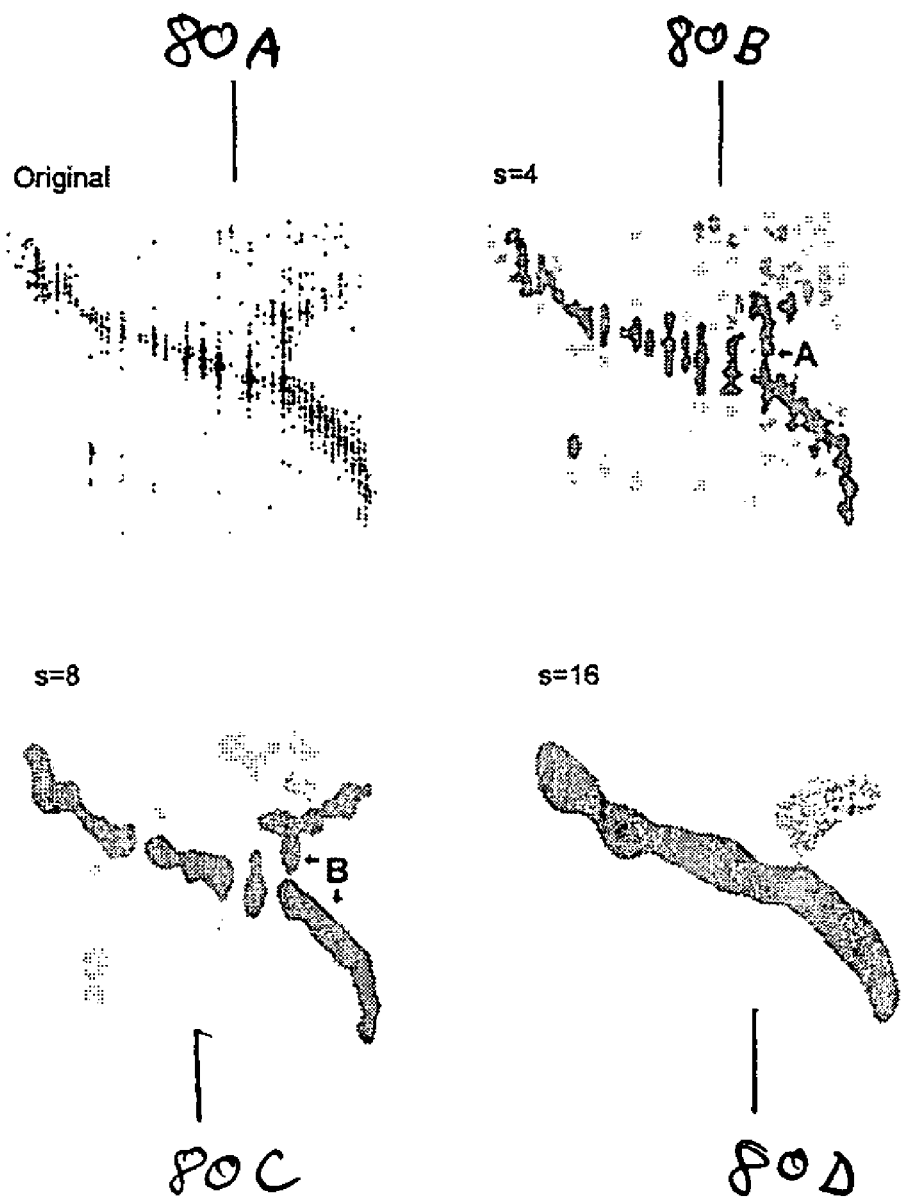
FIG. 10 depicts an original image and Gestalt cartoons of the Hertzprung Russell (HR) diagram according to the present invention.
Figure 11:
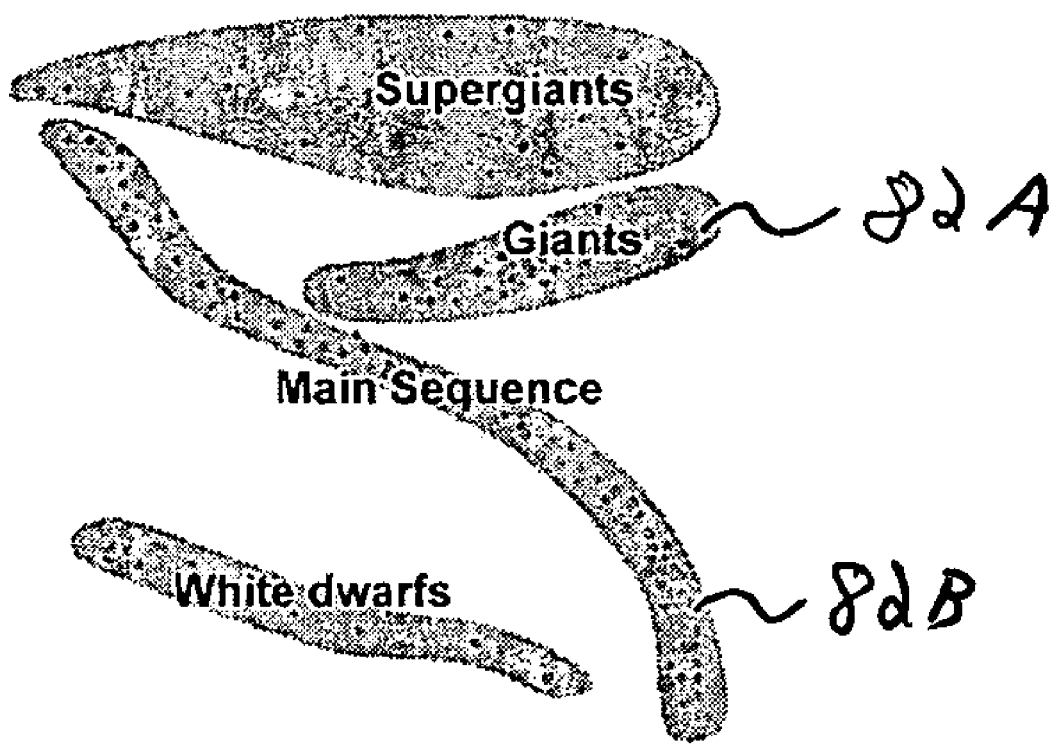
FIG. 11 depicts human expert partitioning of the HR diagram of FIG. 10 according to the present invention.

FIG. 10 shows Gestalt cartoons 80A-D for a complex scatterplot, the famous astronomical Hertzprung-Russell diagram. This scatterplot, which displays data on stars with temperature on the x-axis and absolute magnitude on the y-axis, plays a central role in scientists' conception of stellar evolution. The HR diagram 80A at the top left of FIG. 10 is reproduced from Spence and Garrison (1993), which contains a detailed discussion of this historically significant information graphic. The segmentations in the Gestalt cartoons capture the intuitive experience of reading the diagram: the small-scale (s=4) view 80B emphasizes the vertical structures, while at the s=8 view 80C and the s=16 view 80D the large-scale clusters stand out. The areas highlighted for the s=16 view 80D correspond nicely to the standard organization given by human experts. FIG. 11 shows how an astronomer structures the diagram.

The regions labeled "A" and "B" in FIG. 10 show another example of how a non-tree structure can be an appropriate model. To the left and below "A" there is single large segment, reflecting the small-scale structure of a combined dense vertical and diagonal cluster. But on a larger scale such as the s=8 view 80C, that segment has broken into two parts, at "B", corresponding the "Giants" sequence region 82A and "Main" sequence region 82B in FIG. 11. Thus, in this case, the model of the present invention produces a non-tree lattice structure that corresponds to perceived visual organization. This contrasts with many clustering methods and with conventional scale-space segmentation techniques, which produce trees only.

Figure 12:
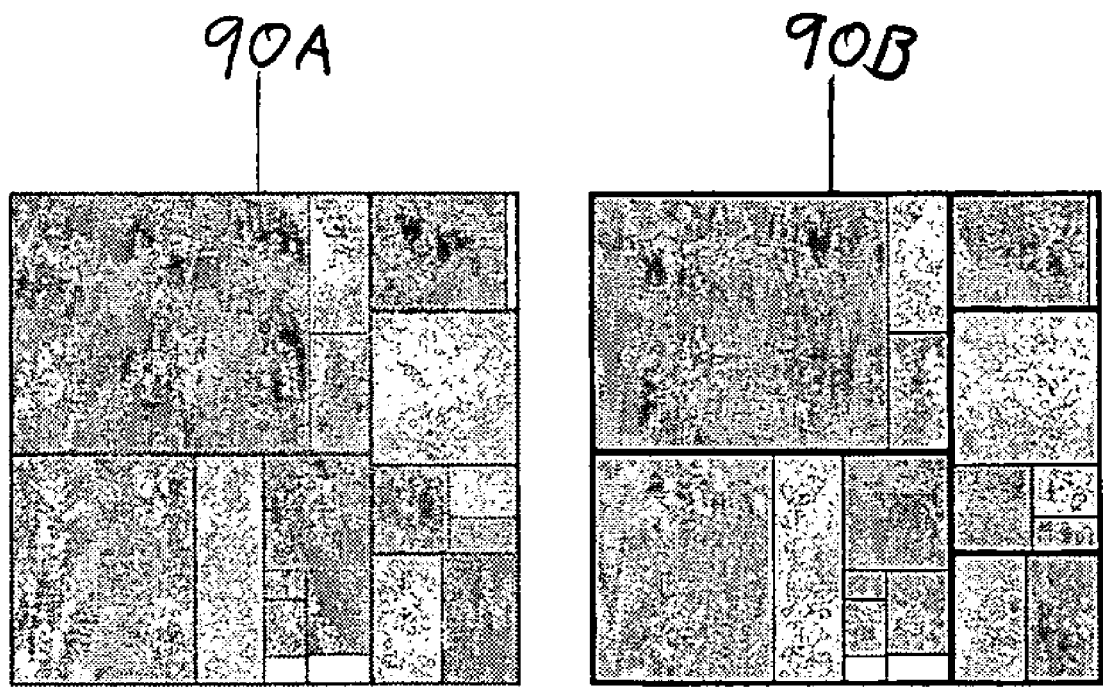
FIG. 12 depicts a stylized version of the current Market Map and a redesigned version with darker and thicker borders according to the present invention.
Figure 13:
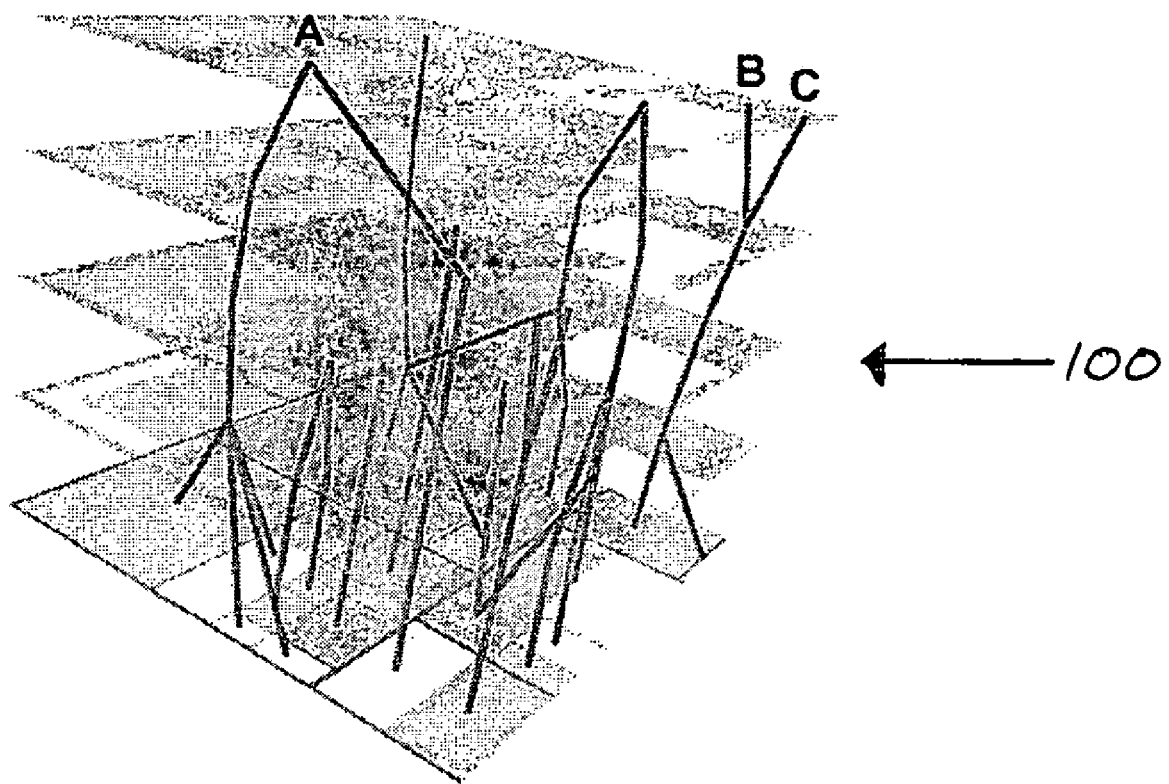
FIG. 13 depicts the resulting $L^+$ structure of original Market Map of FIG. 12 according to the present invention.
Figure 14:
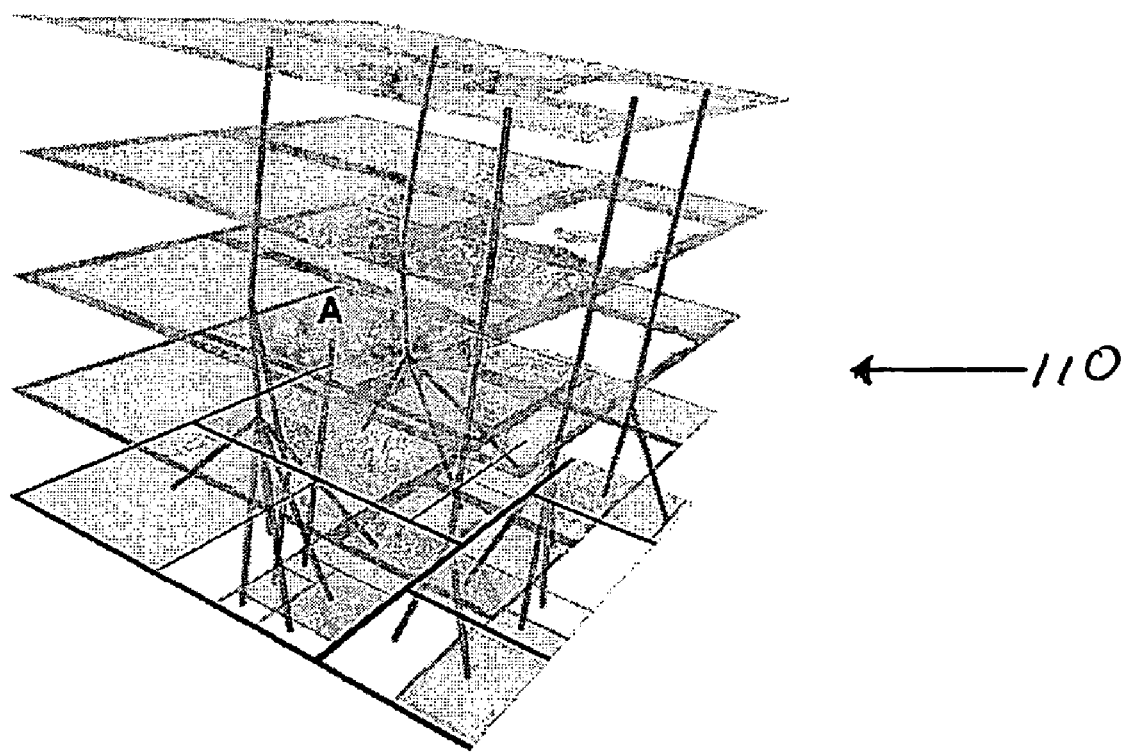
FIG. 14 depicts the resulting $L^+$ structure of the redesigned Market Map of FIG. 12 according to the present invention.

Finally, it will be discussed how the model of the present invention can inform the design of a visualization. Taken as an example is the SmartMoney Market Map (Wattenberg, 1999), a treemap visualization (Shneiderman, 1992) that displays data on several hundred publicly traded stocks. To make a comparison, a stylized version of the current Market Map 90A, and a redesigned version 90B with darker and thicker borders was created as shown in FIG. 12. When these images are processed according to the model of the present invention, the results were clear. FIG. 13 shows the structure 100 derived for the current version. Note that the lattice structure 100 is complex, confusing, and does not follow the underlying hierarchy of the data items. At point "A" in structure 100, for example, two items in different groups are spuriously joined. In FIG. 14, the lattice structure 110 is far simpler and close to a perfect tree.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the diagram of representation system 26 is intended to be illustrative only. For example, representation system 26 could be contained in a different configuration of systems.

We claim:

1. A computerized system for representing a perceptual organization of an image, comprising:
    a scaling system for progressively blurring the image to yield a set of scaling levels, and allocating a spatial index that comprises a rectangular array of integers for each of the set of scaling levels;
    an edge detection system for detecting edges of the image on each of the set of scaling levels;
    a segment identification system for identifying individual segments of the image on each of the set of scaling levels based on the detected edges, and assigning each of the individual segments a non-zero integer as an identifier, wherein corresponding elements of the associated spatial index are set to the identifier; and
    a linking system for linking like individual segments on successive scaling levels based on a comparison of corresponding identifiers of the individual segments to yield a lattice structure, wherein the lattice structure represents the perceptual organization of the image.

2. The system of claim 1, wherein the scaling system convolves the image with a Gaussian kernel and a set of distinct scaling factors.

3. The system of claim 2, wherein each of the set of distinct scaling factors corresponds to one of the set of scaling levels.

4. The system of claim 1, wherein the edge detection system comprises an edge filter that is applied to the image on each of the set of scaling levels to determine edge operators, wherein the edges are determined based on the edge operators.

5. The system of claim 4, wherein the edge filter comprises a Difference-of-Gaussians edge detector.

6. The system of claim 4, wherein the segment identification system determines where the edge operators are not equal to zero on each of the set of scaling levels to identify the individual segments of the image.

7. The system of claim 6, wherein the linking system links the individual segments on successive scaling levels that have like edge operators to yield the lattice structure.

8. The system of claim 7, wherein the like edge operators comprises values other than zero.

9. A program product stored on a computer readable medium for representing a perceptual organization of an image, which when executed by a computer, implements the method comprising:

progressively bluffing the image to yield a set of scaling levels, and allocating a spatial index that comprises a rectangular array of integers for each of the set of scaling levels;

detecting edges of the image on each of the set of scaling levels;

identifying individual segments of the image on each of the set of scaling levels based on the detected edges, and assigning each of the individual segments a non-zero integer as an identifier, wherein corresponding elements of the associated spatial index are set to the identifier; and linking like individual segments on successive scaling levels based on a comparison of corresponding identifiers of the individual segments to yield a lattice structure, wherein the lattice structure represents the perceptual organization of the image.

10. The program product of claim 9, wherein the progressively bluffing convolves the image with a Gaussian kernel and a set of distinct scaling factors.

11. The program product of claim 10, wherein each of the set of distinct scaling factors corresponds to one of the set of scaling levels.

12. The program product of claim 9, wherein the detecting comprises an edge filter that is applied to the image on each of the set of scaling levels to determine edge operators, wherein the edges are determined based on the edge operators.

13. The program product of claim 12, wherein the edge filter comprises a Difference-of-Gaussians edge detector.

14. The program product of claim 12, wherein the identifying determines where the edge operators are not equal to zero on each of the set of scaling levels to identify the individual segments of the image.

15. The program product of claim 14, wherein the linking links the individual segments on successive scaling levels that have like edge operators to yield the lattice structure.

16. The program product of claim 15, wherein the like edge operators comprises values other than zero.

\* \* \* \* \*

UNITED STATES PATENT AND TRADEMARK OFFICE
CERTIFICATE OF CORRECTION

| | | |
|---|---|---|
| PATENT NO. | : 7,684,622 B2 | Page 1 of 1 |
| APPLICATION NO. | : 12/252086 | |
| DATED | : March 23, 2010 | |
| INVENTOR(S) | : Fisher et al. | |

It is certified that error appears in the above-identified patent and that said Letters Patent is hereby corrected as shown below:

Please correct Patent Office errors as follows:

Page 1, Column 1, After (65) Prior Publication Data

US 2009/0052781 A1   Feb. 26, 2009

Please Insert -- Related U.S. Application Data

(63) Continuation of application No. 10/819,588, filed on April 7, 2004, now Patent No. 7,489,821.

(60) Provisional application No. 60/461,082, filed on April 8, 2003. --

Signed and Sealed this
Twenty-eighth Day of August, 2012

David J. Kappos
*Director of the United States Patent and Trademark Office*